Dec. 10, 1946.  C. J. CRANE  2,412,206
SENSITIVE SWITCH CONTROL APPARATUS
Filed Nov. 28, 1944
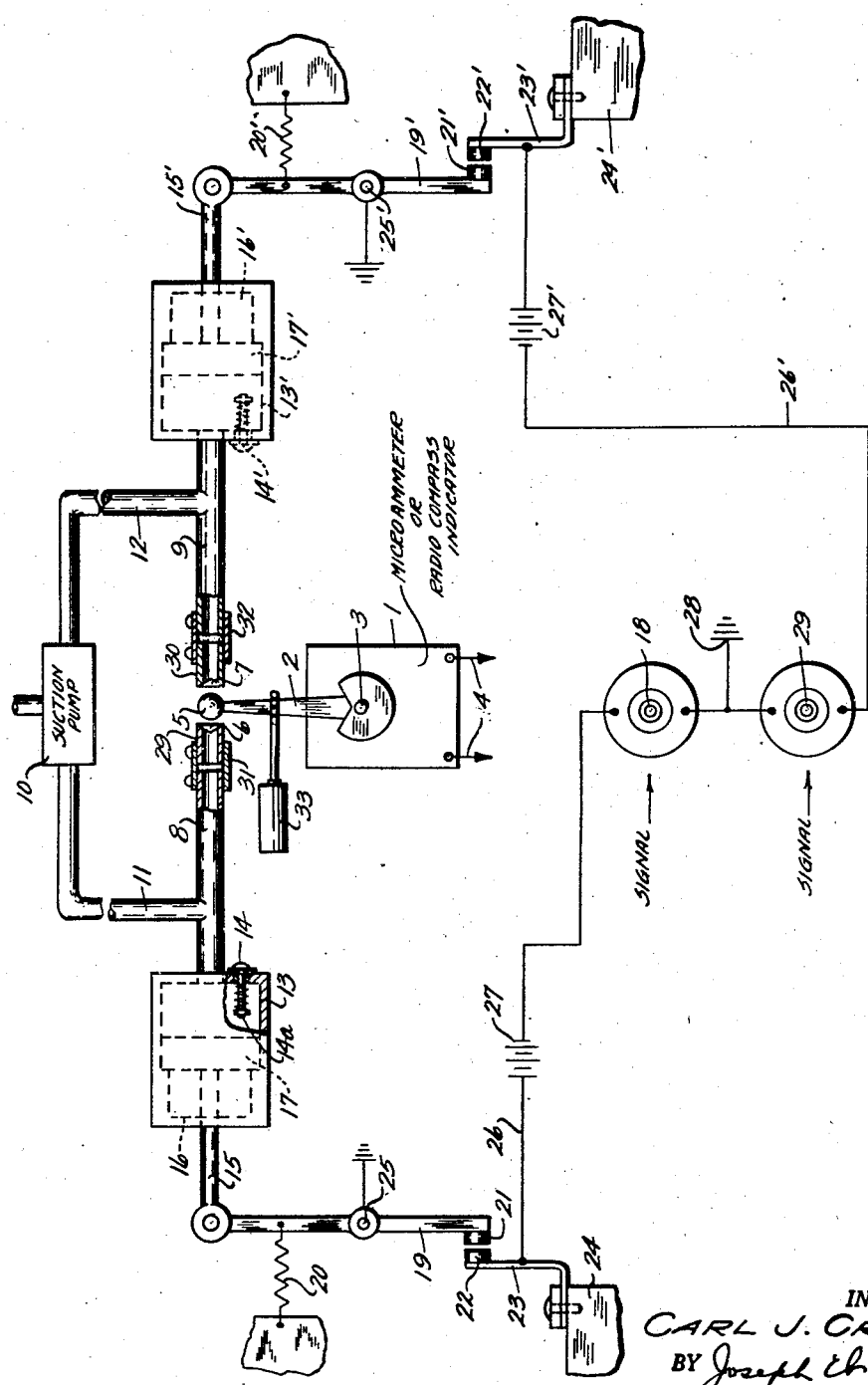
INVENTOR.
CARL J. CRANE
BY
ATTORNEYS Patented Dec. 10, 1946

2,412,206

UNITED STATES PATENT OFFICE 2,412,206

SENSITIVE SWITCH CONTROL APPARATUS

Carl J. Crane, Sacramento, Calif.

Application November 28, 1944, Serial No. 565,557

5 Claims. (Cl. 177—311)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to sensitive switch control apparatus in which a very sensitive indicator is used to accurately control the operation of a second switch control or indicating device for indicating the operation of the former indicator, and more particularly the invention relates to an electrical switch control device, operable by the indicator or pointer member of an extremely sensitive value-indicating instrument, such as a microammeter of a radio compass indicator for aircraft.

An object of my invention is the provision of an electric switch actuator or control device which is positively responsive to the most minute effort of a primary indicator, in accordance with the movement of the primary indicator, from a predetermined position without subjecting the primary indicator to any additional or reactive force that would tend to disturb or reduce the sensitivity of the primary indicator.

Another object of the invention is the provision of a value-indicating device having sensitive pointer means with means associated with the pointer means for operating a second indicating means, incident to limited movement of said pointer means, from a predetermined reference position without affecting a restraint on the movement of the pointer means from said reference position.

Other objects and advantages of the invention will become apparent from the following description, taken in connection with the accompanying drawing, disclosing somewhat diagrammatically in side elevation a sensitive indicating device having my improved switch control apparatus shown in cooperative association therewith, parts being broken away and shown in section.

The reference numeral 1 indicates a microammeter or a radio compass indicator device preferably of conventional construction, having a pointer 2, movable by the meter 1 around a pivotal center 3, current being supplied to the indicator device 1 through the input circuit conductors 4. A ball-shaped closure member 5 is secured to the outer end of the pointer 2 forming a valve closure member for two vent openings 6 and 7 in the ends of a pair of spaced, axially aligned suction conduit pipes 8 and 9.

Suction pressure is maintained in the section conduit pipes 8 and 9 by any suitable means, such as by a suction or vacuum pump 10, communicating conduits 11 and 12 being provided, connecting the pump 10 with the suction conduits 8 and 9. The suction conduit 8 is connected at one end to a closed cylinder 13 having spring seated venting valve 14 in one end wall thereof and a piston rod 15 extending through the opposite end wall 16 and connected to a piston member 17 which is operable within the cylinder 13. The venting valve 14 has a stem 14a projecting inwardly into the path of movement of the piston 17 when the piston is moved to the right by suction pressure, or a reduction of pressure within the cylinder 13. The piston 15 operates a secondary indicator or signal device 18 through the instrumentality of a circuit-closing switch lever 19, having a spring 20 yieldably holding the electrical contact 21 which is carried by the lever, in spaced relation to a stationary electrical contact 22 carried by a yieldable resilient bracket arm 23 which is insulated from framework 24 of the supporting structure.

The circuit-closing switch lever 19 is grounded on the metallic framework of the supporting structure through its pivot connection, as indicated at 25, and a conductor 26, having a battery 27 intermediate its ends, connects the bracket arm 23 to one pole of the signal-indicating device or lamp 18. The other pole of the signal-indicating device or lamp 18 is grounded to the supporting structure at 28, completing the electrical operating circuit for the signal lamp 18 when the two contacts, 21 and 22, are brought together. The other suction conduit pipe 9 is in communication with a second suction operated cylinder 13' having a spring seated venting valve 14' therein. The cylinder has a movable piston 17' therein having a piston rod 15' for operating a signal device 29 in a manner identical to the operation of the signal device 18. The piston 17' operates the piston rod 15' which is connected to a switch lever 19' having a return spring 20' for holding the circuit-closing lever contact 21' on the lever in spaced relation to a stationary contact 22' carried on a bracket 23', in insulated relation to the metallic supporting structure 24'. The switch lever 19' is grounded to the metallic supporting structure at 25'. An electrical conductor 26' having a battery 27' intermediate its ends, establishing an electrical connection to the yieldable resilient bracket arm 23' and to one pole of the signal device 29 while the other pole of the signal device is connected by a short conductor to the ground terminal 28, as shown in the drawing.

The suction vent openings 6 and 7 are preferably disposed in opposed spaced relation at opposite sides of the movable closure member 5 which is carried on the end of pointer 2 and the positions of these vent openings are adjustable preferably with respect to the closure member 5. The end portions 29 and 30 of the venting conduits 8 and 9 which carry the vent openings 6 and 7 are axially adjustable with respect to each other and the closure member 5 and are adapted to be held in their adjusted position by tubular clamp members 31 and 32. This adjustment is provided so that the intermediate control or reference position of the indicator 2 and its closure 5 may be varied.

If desired, a dash-pot 33 may be provided and connected to the pointer 2, to prevent too rapid oscillation of the indicator member 2 when the closure member 5 is released from the vent opening by the venting of the suction conduits, by the venting valves 14' or 14.

In the operation of the device, the end portions 29 and 30 are adjusted with respect to the closure member 5 carried by the pointer 2 of the supersensitive value-indicating instrument 1 so as to position the vent openings 6 and 7 in equally-spaced relation to the closure member 5 at each side thereof when the pointer is in a predetermined value or direction indicating position.

With the suction pump 10 in operation, suction is applied equally to the conduits 8 and 9, but the spaced arrangement of the venting openings 6 and 7 with respect to the closure 5 prevents this suction or vacuum pressure from increasing sufficiently to move the piston member 17, or the piston member 17' inwardly to operate one or the other of the switch levers 19 or 19' to close either of the circuits to the secondary signal devices 18 or 29.

When the pointer 2 moves toward one of the vent openings 6 or 7, sufficiently close to reduce the area of that opening, the closure 5 thereon will be immediately drawn against the vent opening by the suction pressure within the conduit, completely closing the vent opening. The pointer will be positively moved or tensioned in the same direction as it was being moved by the indicating device as it closed off the vent opening. When the vent opening is closed, the suction pressure within the conduit 8 increases and draws the power take-off piston 17 to the right, rocking the switch lever 19 to bring the two electrical contacts 20 and 21 into contacting engagement closing the operating circuit to the electric signal or indicating means 18, or other device that may be controlled by the circuit.

Final movement of the piston 17 toward the suction conduit 8 flexes the contact arm 22 and causes the venting valve 14 to be forced to open position by the piston 17, relieving the suction pressure within the cylinder 13 and within the conduit 8. This reduction in pressure permits the piston to return to its initial non-operative position, and causes the contacts 20 and 21 to be again separated from each other, rendering the signal device 18 non-operative. The venting valve 14 also functions to simultaneously vent the conduit 8, which relieves the suction pressure on the closure member 5 on the pointer 2, permitting the pointer to return freely to its proper indicating or reference position.

When the pointer 2 moves in the opposite direction or to the right, the same operation will take place with respect to the other power take-off or indicating apparatus controlling the other signal 29. Movement of the closure member 5, sufficiently near the vent opening 7 to partially close this opening, causes an increase in the vacuum or suction pressure in the conduit 9, and the closure 5 will be tensioned by this suction pressure in the same direction as it moved during its initial indicating movement, completely closing the vent opening 7 and the increase in suction pressure causes the operation of the auxiliary power take-off and indicating mechanism 29.

While I have described my invention in connection with a simple embodiment for illustrating an operative structure for carrying out the invention, it is obvious that various changes may be made therein, without departing from the spirit of the invention as defined in the appending claims.

I claim:

1. In an indicating device of the class described, a supersensitive value indicator having pointer closure means movable in opposite directions, a suction conduit having vent openings at opposite sides of the pointer closure means, means for creating a suction pressure in said conduit to be selectively closed by said pointer closure means upon movement thereof toward said vent openings from a predetermined reference position between said vent openings to cause said pointer to be held by said suction pressure, closing said vent openings, suction operated secondary indicating means disposed in communication with said suction conduit, operable by a predetermined degree of increased suction pressure in said conduit when said venting means is closed by said pointer closure means, and means operable by said secondary indicating means incident to movement thereof by said increased suction to relieve the suction therein, to free the pointer closure means from said suction pressure operable thereon when the same is disposed to close the said vent means and to simultaneously render said secondary suction operated indicating means non-operative.

2. In an indicating device of the class described, a pair of open-ended fixed suction conduits disposed with their ends facing each other in spaced relation, a closure member movable from a normal intermediate spaced position between the ends of said conduits toward one or the other suction conduit ends to close one or the other of said suction conduits, suction producing means in communication with said conduits to increase the suction pressure therein when closed by said closure member, suction operated indicating means in communication with each of said suction conduits operable by a predetermined increase in the suction pressure within said conduit, venting means for each of said suction conduits movable to venting position by said suction operated indicating means incident to operation thereof by said predetermined increase in suction pressure, to vent the suction conduit and relieve the suction pressure on said last-mentioned suction operated indicating means, and to relieve the suction pressure on said closure member to release the same, and on said last-mentioned suction operated indicating means to normalize the same.

3. In an indicating device of the class described, a pair of suction conduits having vent openings therein, disposed adjacent each other in spaced opposed relation for venting said conduits to relieve the suction therein, a vent closure member movably disposed between said vent openings to close one or the other of said vent openings upon movement thereof in one direction or the opposite direction to increase the suction in one or the other of said conduits to render the conduit suction pressure operable upon said vent closure member to tension said vent closure member toward the vent opening, sensitive actuating means for operating said vent closure member, secondary venting means for each of said conduits, suction operated power means in communication with each of said conduits, operable by predetermined suction pressure within each of said conduits to actuate said secondary venting means, to relieve the suction pressure within said conduit acting on said vent closure member when the same is in its vent closing position and relieve the suction pressure on said suction pressure operated power means.

4. Apparatus as claimed in claim 3 in which signal means are provided, operable by said power means incident to movement thereof by an increase in the suction pressure within said suction conduit, and means for rendering said signal means non-operative when said suction pressure conduits are vented by said secondary venting means.

5. Apparatus as claimed in claim 3 in which said power means comprises a closed cylinder having a piston therein operable by predetermined suction pressure within said cylinder, and said secondary venting means comprises a venting valve movably disposed in the path of movement of said piston, to be operated thereby, to vent said cylinder when said piston is operated by said suction pressure, to relieve the suction pressure in the cylinder and in the communicating suction conduits, and power take-off means which is connected to said piston to be operated thereby.

CARL J. CRANE.